US009151661B2

(12) United States Patent
Farlotti et al.

(10) Patent No.: US 9,151,661 B2
(45) Date of Patent: Oct. 6, 2015

(54) APPARATUS FOR DETERMINING THE DIMENSIONS OF A PARCEL

(75) Inventors: Laurent Farlotti, Pruniers (FR); Ruben Rico, Paris (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 862 days.

(21) Appl. No.: 13/249,497

(22) Filed: Sep. 30, 2011

(65) Prior Publication Data

US 2012/0140065 A1    Jun. 7, 2012

(30) Foreign Application Priority Data

Sep. 30, 2010    (EP) .................................... 10306062

(51) Int. Cl.
*H04N 9/47* (2006.01)
*G01G 19/00* (2006.01)
*G01B 11/02* (2006.01)

(52) U.S. Cl.
CPC .............. *G01G 19/005* (2013.01); *G01B 11/02* (2013.01)

(58) Field of Classification Search
CPC ........................................... G01B 11/00–11/06
USPC .......................... 348/135, 136; 356/625, 635
See application file for complete search history.

(56) References Cited

U.S. PATENT DOCUMENTS

| 5,331,118 | A | | 7/1994 | Jensen |
| 5,528,517 | A | | 6/1996 | Loken |
| 5,841,541 | A | * | 11/1998 | Dlugos .......................... 356/634 |
| 5,956,525 | A | * | 9/1999 | Minsky ............................. 396/3 |
| 6,614,928 | B1 | * | 9/2003 | Chung et al. .................. 382/154 |
| 2005/0155419 | A1 | * | 7/2005 | Naruoka .......................... 73/159 |
| 2007/0201859 | A1 | * | 8/2007 | Sarrat ............................ 396/322 |
| 2012/0057022 | A1 | * | 3/2012 | Nechiporenko et al. ...... 348/135 |

FOREIGN PATENT DOCUMENTS

JP    2005-227260 A    8/2005

OTHER PUBLICATIONS

European Search Report of EP 10 30 6062 dated Jan. 21, 2011.

* cited by examiner

*Primary Examiner* — Sath V Perungavoor
*Assistant Examiner* — Nathnael Aynalem
(74) *Attorney, Agent, or Firm* — Seed IP Law Group PLLC

(57) ABSTRACT

A method of determining the dimensions of a parcel, in which method the parcel to be measured is placed against an orthogonal reference support made up of at least two perpendicular vertical side panels, each of which is provided with a grid, and an image of the support and of the parcel together is acquired so as to determine at least three perpendicular edges of the parcel, and then the number of intervals of the grid that form each of the edges is counted so as to obtain the dimensions in mm of the parcel.

14 Claims, 2 Drawing Sheets

APPARATUS FOR DETERMINING THE DIMENSIONS OF A PARCEL

FIELD OF THE INVENTION

The present invention relates to the field of mail handling, and it relates in particular to apparatus for automatically determining the dimensions of a parcel that is then to be franked in a franking system or to be fed into a logistics carriage system.

PRIOR ART

It is well known that determining the franking amount or "postage amount" for a mailpiece depends on various parameters such as, in particular, the recipient's address, the mail class, the requested service, and the weight or the dimensions of said mailpiece. The address, class, and service may be entered on the keyboard of the franking system, and the weight may be obtained using automatic scales internal or external to the franking system. However, automatically determining the dimensions of the mailpiece is more difficult, in particular when it is a parcel, and such automatic determination of the dimensions usually requires ultrasound systems or light-emitting diode (LED) systems, for example.

Unfortunately, such systems are relatively costly and use of them is justified only for large franking volumes and can hardly be entertained in bottom-of-the-range (low-cost) franking systems designed to frank from one to a few tens of parcels per day. Another limitation on such systems is that, in spite of their cost, they take account of only three edges of the parcel. When the parcel is not in the shape of a rectangular block, that can give rise to errors in determining said dimensions.

OBJECT AND DEFINITION OF THE INVENTION

An object of the present invention is thus to remedy the above-mentioned drawbacks and to make it possible, at very low cost, to determine the dimensions of a parcel. An object of the invention is to enable such determination to be performed in a manner that is simple but nevertheless automatic.

These objects are achieved in accordance with the invention by means of apparatus for determining the dimensions of a parcel, said apparatus comprising:
- an orthogonal reference support made up of at least two perpendicular vertical side panels, each of which is provided with a grid having a predetermined interval, against which panels said parcel is placed, said vertical side panels co-operating with a support surface for supporting said parcel to define a three-dimensional rectangular co-ordinate system;
- an image sensor for acquiring an image of said parcel against said orthogonal reference support; and
- a processor unit connected to said image sensor for the purpose of determining the dimensions of said parcel on the basis of said image acquired in this way;

wherein, on the basis of said image, said processor unit determines the edges of said parcel; and said processor unit determines in millimeters (mm) each of said dimensions of said parcel by counting a number of intervals of said grid along at least three perpendicular edges of said parcel forming a fraction of outline of said parcel.

The presence of said grid having a predefined interval makes it possible to determine the dimensions in mm of the parcel once its edges have been obtained, merely by counting the number of intervals surrounding said parcel.

Preferably, said support surface is made up of a horizontal floor panel that is provided with a grid or by a horizontal floor panel that is plain and without any grid.

Advantageously, said image sensor is a webcam provided with a wide-angle lens and with an autofocus system.

The invention also provides an associated method of determining the dimensions of a parcel, in which method the parcel to be measured is placed against an orthogonal reference support made up of at least two perpendicular vertical side panels, each of which is provided with a grid having a predetermined interval and co-operating with a support surface for supporting said parcel to define a three-dimensional rectangular co-ordinate system, wherein said method comprises the following steps:
- using an image sensor to acquire an image of said parcel disposed on said orthogonal reference support;
- using said processor unit (16) to determine the edges of said parcel in the image acquired in this way; and
- using said processor unit to count the number of intervals of said grid along at least three perpendicular edges of said parcel forming a fraction of outline of said parcel, so as to obtain each of said dimensions in mm.

Preferably, when the numbers of intervals of said grid relating to two parallel edges are different, one of the following values is taken into account: the minimum value; the maximum value; the mean; or any other value determined on the basis of said numbers of intervals.

Advantageously, said grid forming each of said side panels may be made up of marks that are separated from one another by an equal and predetermined distance, or else of a meshing segmenting the space into elements of identical and predetermined shape and size.

BRIEF DESCRIPTION OF THE DRAWINGS

Other characteristics and advantages of the invention appear from the following description of particular embodiments, given by way of example, and with reference to the accompanying drawings, in which.

DETAILED DESCRIPTION OF PREFERRED EMBODIMENTS

Figure 1:
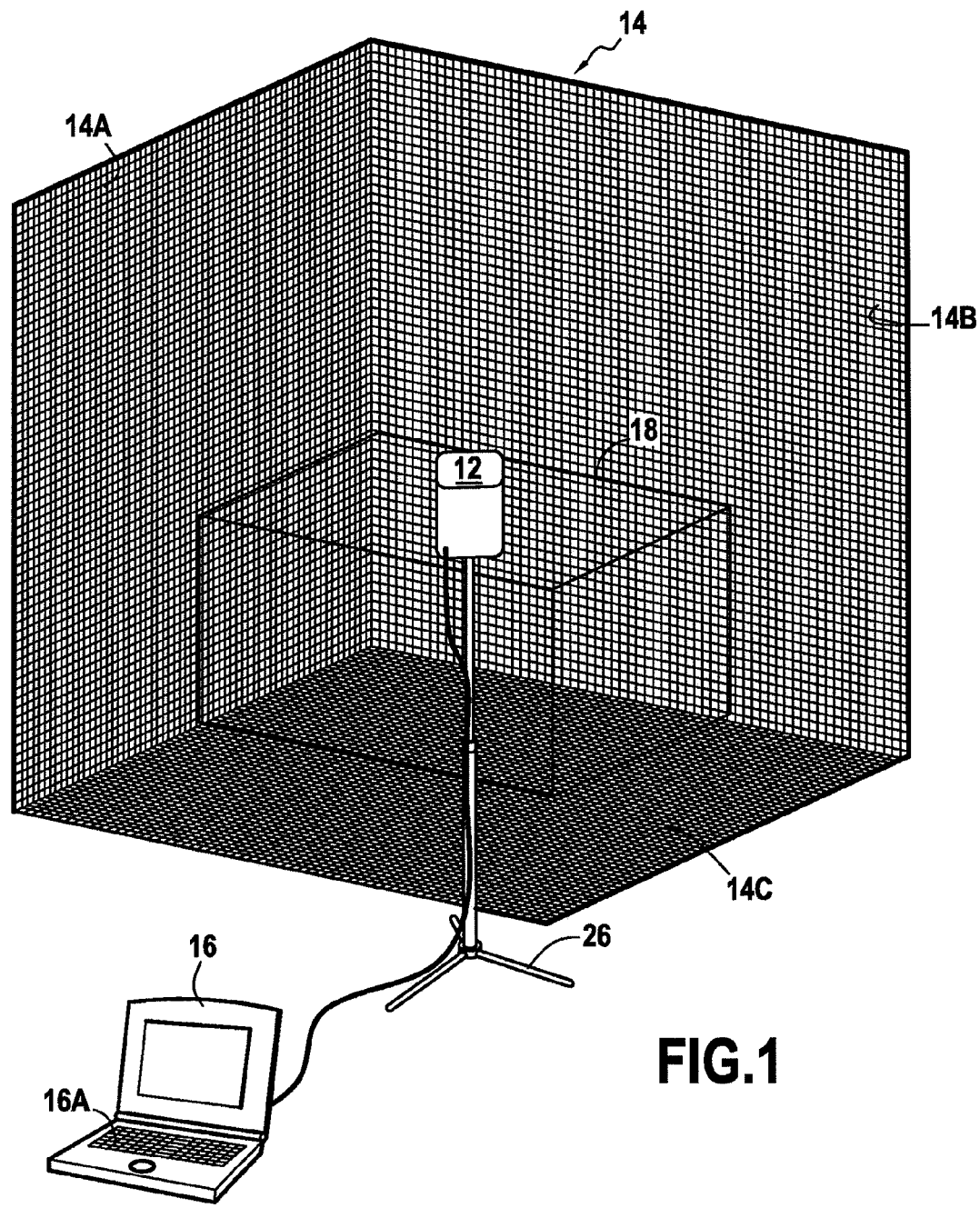
FIG. 1 is a diagrammatic view showing an embodiment of measurement apparatus of the invention for measuring the three dimensions of a parcel.

FIG. 1 shows the apparatus of the invention making it possible, at very low cost, and by using simple means, to determine the three dimensions (length, width, and height) of a parcel.

This apparatus 10 is constituted by an image sensor 12, by an orthogonal reference support 14, and by a processor unit 16 connected to the image sensor for the purpose of determining the dimensions of a parcel 18 resting on said support on the basis of its image acquired by the image sensor.

The orthogonal reference support, against the corner of which the parcel to be measured is placed, is made up of three panels 14A, 14B, 14C, made of cardboard or of plastic, and sufficiently rigid to enable the parcel to be held in abutment in said corner, each panel being disposed perpendicularly to the other two panels in such a manner as to define, at their common join lines, the three axes X, Y, and Z of a three-dimensional rectangular co-ordinate system. The two vertical side panels 14A, 14B are provided with grids that are preferably uniform, and that have a predefined interval, it being possible for the horizontal floor panel 14C forming the support surface for supporting the parcel also to have the same grid, or else, preferably, for said floor panel merely to have a plain black background. For example, the grid may be made up of a meshing segmenting the space into a multiplicity of tile-like elements of identical and predetermined shape and size (e.g. squares of determined dimensions 5 mm by 5 mm) or else the grid may be made up of marks, e.g. crosses or stars, spaced apart from one another at said predefined interval.

The image sensor 12 is advantageously mounted on a tripod 26, or on any other similar support (column, table, etc.), preferably external to the orthogonal reference support, and optionally raised relative thereto, so as to obtain an image including the entire orthogonal reference support. However, in order not to be too far away from the parcel to be measured, the image sensor (of the charge-coupled device (CCD) type or of the complementary metal-oxide semiconductor (CMOS) type, e.g. a webcam having a resolution of at least two million pixels) is preferably provided with a wide-angle (about) 90° lens and with an autofocus system so as to enable an image to be acquired that is sharp regardless of the dimensions of the parcel, of side in the range 5 centimeters (cm) to 70 cm when considering, for example, a reference support of 80 cm×80 cm×80 cm.

The processor unit 16 may be constituted conventionally by a general-purpose computer of the personal computer (PC) or laptop type, including hardware and software means 16A adapted to acquire and to process images coming from the image sensor 12 so as to determine the dimensions of the parcel using an appropriate measurement method.

Figure 2:
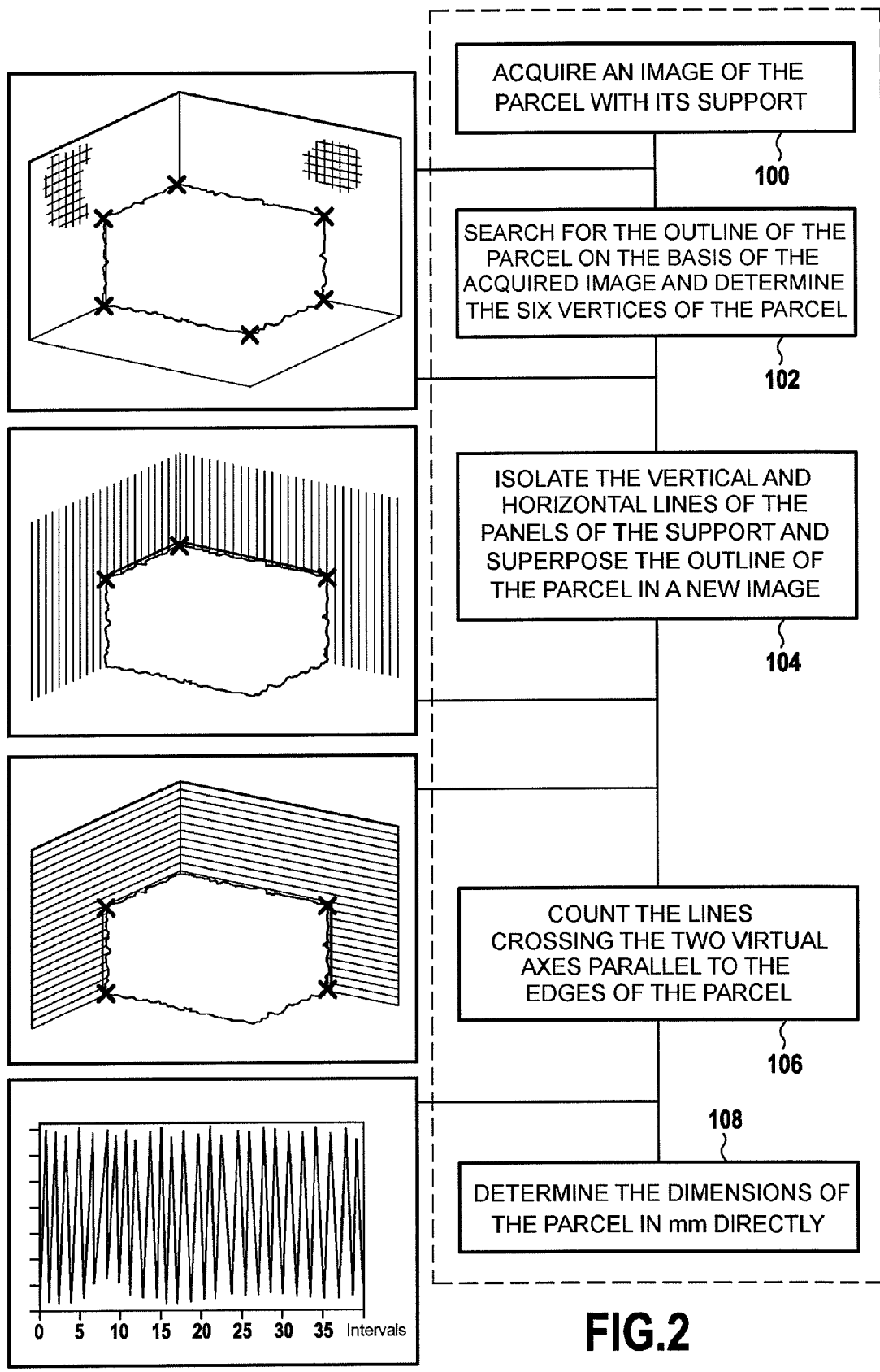
FIG. 2 shows the successive steps making it possible to determine the dimensions of a parcel using the measurement apparatus shown in FIG. 1.

The method of the invention for measuring the dimensions of the parcel is shown with reference to FIG. 2.

Thus, in a first step 100, an image of the parcel that is to have its dimensions measured, showing the parcel placed against the orthogonal reference support 14, is acquired by the image sensor 12 and then, in a step 102, is transmitted to the processor unit 16 for analysis. This analysis consists in using a known outline search method (blob analysis or Hough transform, for example) to determine the outline of the parcel, which outline is likened to a hexagon, and in determining its six visible vertices (represented by crosses in the upper left portion of FIG. 2). Then, in a step 104, in known manner, the horizontal and vertical lines forming the grid of each of the two vertical side panels 14A, 14B against which the parcel is placed are successively isolated and superposed in a new image with the previously determined outline of the parcel. Two horizontal virtual axes are then drawn parallel to the two edges interconnecting the top vertices of the parcel and, in a step 106, for each of these two axes, the number of vertical lines crossed (one line corresponding to one interval in the grid) is determined. Similarly, at least one vertical virtual axis is drawn parallel to one of the two edges interconnecting the right and left vertices of the parcel, and, for this axis, the number of horizontal lines crossed is also determined. From the number of these crossings, the dimension in mm of the parcel along the corresponding axis is deduced directly in a final step 108.

The accuracy of the measurement is limited by the distance existing between two lines (the interval of the grid), but it is nevertheless possible to increase said accuracy by interpolating the position of the edge vertex when said vertex terminates between two adjacent intervals.

In addition, by making this counting step systematic for each of the six edges of the parcel, it is possible to verify that the parcel is substantially in the shape of a rectangular block. In the event that the measurement of the parallel edges differs significantly, the processor unit can be programmed to take account of the minimum value, of the maximum value, of the mean value, or of any other value determined on the basis of the measured values, as a function of the specifications required by the carrier.

In the event of low contrast, this method facilitates determining the width or the length of the parcel. It should also be noted that, in such an event, the horizontal panel 14C does not need to be provided with a grid system and can thus be uniformly black, its grid system being essential only if it is desired to perform systematic counting along all six edges of the parcel, as mentioned above.

It should be noted that, although with concern for simplification, the figures essentially show a regular grid system, other forms of meshing, such as meshing made up of hexagons, may be used.

What is claimed is:

1. A method of determining the dimensions of a parcel, in which the parcel to be measured is placed against an orthogonal reference support comprising at least two perpendicular vertical side panels, the surfaces of each of the at least two perpendicular vertical side panels being provided with a grid comprising horizontal and vertical lines having a predetermined interval and co-operating with a support surface for supporting the parcel to define a three-dimensional rectangular co-ordinate system, the method comprising:
   acquiring a single image of the parcel placed against the at least two perpendicular vertical side panels of the orthogonal reference support;
   searching for an outline of the parcel in the acquired single image;
   isolating vertical and horizontal lines of the grid provided on the at least two vertical side panels;
   superimposing the searched for outline of the parcel and the isolated horizontal and vertical lines into a superimposed image;
   counting a number of the isolated horizontal lines of the grid and a number of the isolated vertical lines of the grid crossed by edges of the searched for outline of the parcel on the at least two perpendicular vertical side panels in the superimposed image; and
   determining the dimensions of the parcel based on the counted number of the isolated horizontal lines and the counted number of the isolated vertical lines.

2. The method according to claim 1, wherein
the support surface comprises a horizontal floor panel provided with a grid comprising two sets of perpendicular horizontal lines, the two sets of lines having a predetermined interval,
isolating the two sets of lines of the grid provided on the horizontal floor panel; and
the counting further comprises counting a number of the two sets of isolated lines of the grid provided on the horizontal floor panel crossed by the edges of the searched for outline of the parcel on the support surface.

3. The method according to claim 1, wherein, when a counted number of the isolated horizontal lines of the grid crossed by the edges of the searched for outline of the parcel on a first perpendicular vertical side panel of the at least two perpendicular vertical side panels is different from a counted number of the isolated horizontal lines of the grid crossed by the edges of the searched for outline of the parcel on a second perpendicular vertical side panel of the at least two perpendicular vertical side panels, at least one of the following values is taken into account to determine the dimensions of the parcel: the minimum value of the number of the isolated horizontal lines crossed, the maximum value of the number of the isolated horizontal lines crossed, the mean of the number of the isolated horizontal lines crossed, or any other value determined on the basis of the number of the isolated horizontal lines crossed.

4. An apparatus for determining the dimensions of a parcel, the apparatus comprising:
- an orthogonal reference support comprising at least two perpendicular vertical side panels, the surface of each of the at least two perpendicular vertical side panels being provided with a grid comprising horizontal and vertical lines having a predetermined interval, the vertical side panels being configured to co-operate with a support surface for supporting the parcel to define a three-dimensional rectangular co-ordinate system;
- an image sensor configured to acquire a single image of the parcel placed against the at least two perpendicular vertical side panels of the orthogonal reference support; and
- a processor connected the image sensor, the processor being configured to:
- search for an outline of the parcel in the acquired single image;
- isolate vertical and horizontal lines of the grid provided on the at least two vertical side panels;
- superimpose the searched for outline of the parcel and the isolated horizontal and vertical lines into a superimposed image;
- count a number of the isolated horizontal lines of the grid and a number of the isolated vertical lines of the grid crossed by edges of the searched for outline of the parcel on the at least two perpendicular vertical side panels in the superimposed image; and
- determine the dimensions of the parcel based on the counted number of the isolated horizontal lines and the counted number of the isolated vertical lines.

5. The apparatus according to claim 4, wherein
the support surface comprises a horizontal floor panel provided with a grid comprising two sets of perpendicular horizontal lines, the two sets of lines having a predetermined interval, and
the processor is further configured to:
- isolate the two sets of lines of the grid provided on the horizontal floor panel; and
- count a number of the two sets of isolated lines of the grid provided on the horizontal floor panel crossed by the edges of the searched for outline of the parcel on the support surface.

6. The apparatus according to claim 4, wherein the support surface comprises a horizontal floor panel, the horizontal floor panel not including a grid.

7. The apparatus according to claim 5, wherein the horizontal and vertical lines of the grid provided on the at least two perpendicular vertical side panels are separated from one another by an equal and predetermined distance.

8. The apparatus according to claim 5, wherein the grid provided on the at least two perpendicular vertical side panels comprises a meshing segmenting the surface of each of the at least two perpendicular vertical side panels being into elements of identical and predetermined shape and size.

9. The apparatus according to claim 4, wherein the image sensor comprises a webcam comprising a wide-angle lens and an autofocus system.

10. A mailpiece franking system comprising the apparatus for determining the dimensions of a parcel according to claim 4.

11. The method according to claim 1, wherein
the superimposing comprises:
- superimposing the searched for outline of the parcel and the isolated horizontal lines into a first superimposed image; and
- superimposing the searched for outline of the parcel and the isolated vertical lines into a second superimposed image, and
the counting comprises:
- counting the number of the isolated horizontal lines of the grid crossed by edges of the searched for outline of the parcel on the at least two perpendicular vertical side panels in the first superimposed image; and
- counting the number of the isolated vertical lines of the grid crossed by edges of the searched for outline of the parcel on the at least two perpendicular vertical side panels in the second superimposed image.

12. The method according to claim 1, wherein the determining the dimensions of the parcel comprises directly determining the dimensions of the parcel in millimeters.

13. The apparatus according to claim 4, wherein the processor is further configured to:
- superimpose the searched for outline of the parcel and the isolated horizontal lines in a first superimposed image;
- superimpose the searched for outline of the parcel and the isolated vertical lines in a second superimposed image;
- count the number of the isolated horizontal lines of the grid crossed by edges of the searched for outline of the parcel on the at least two perpendicular vertical side panels in the first superimposed image; and
- count the number of the isolated vertical lines of the grid crossed by edges of the searched for outline of the parcel on the at least two perpendicular vertical side panels in the second superimposed image.

14. The apparatus according to claim 4, wherein the processor is further configured to determine the dimensions of the parcel comprises directly determining the dimensions of the parcel in millimeters.

* * * * *